Nov. 19, 1963   P. GAUDILLERE   3,111,670
DEVICE FOR DETERMINING THE DIRECTION OF
THE GROUND SPEED OF A MOVING BODY
Filed Dec. 9, 1959   3 Sheets-Sheet 1
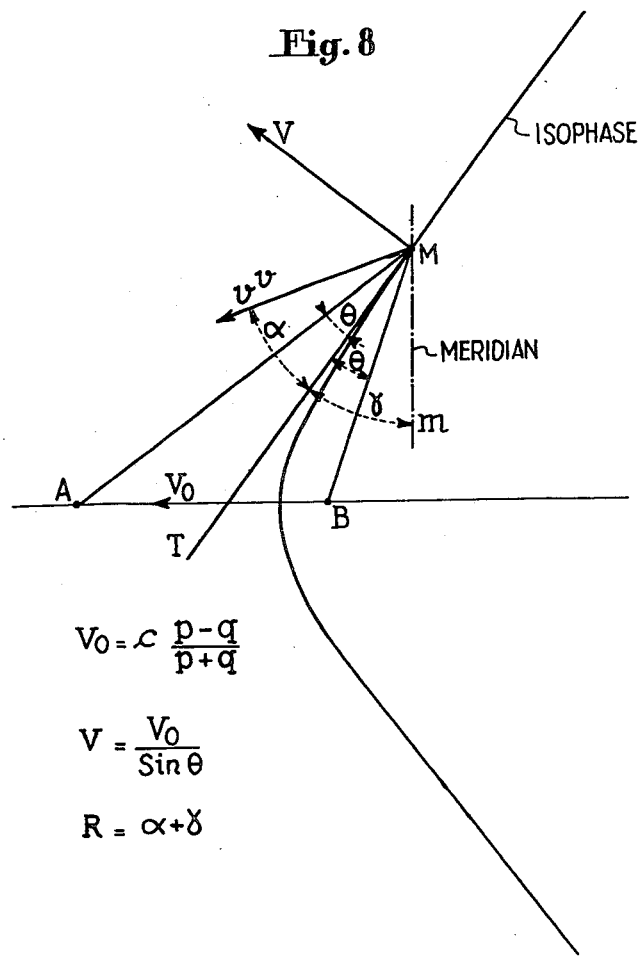
Fig. 8
$$V_0 = c \frac{p-q}{p+q}$$
$$V = \frac{V_0}{\sin \theta}$$
$$R = \alpha + \gamma$$
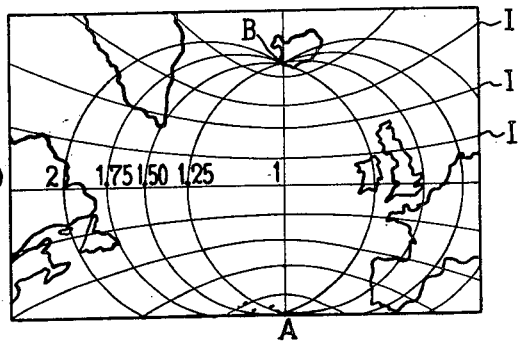
Fig. 1  $\frac{V}{V_0}$
INVENTOR.
PIERRE GAUDILLERE
BY  *Le Blanc and Shur*
ATTORNEYS Nov. 19, 1963     P. GAUDILLERE     3,111,670
DEVICE FOR DETERMINING THE DIRECTION OF
THE GROUND SPEED OF A MOVING BODY
Filed Dec. 9, 1959     3 Sheets-Sheet 2
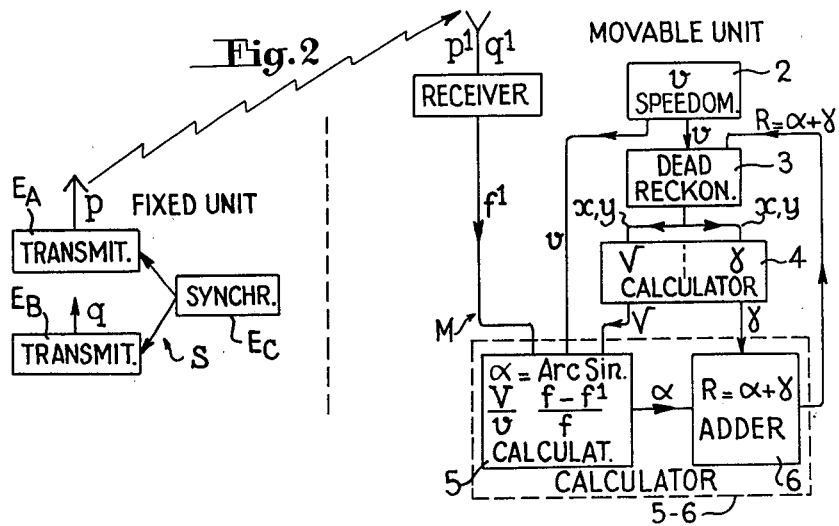
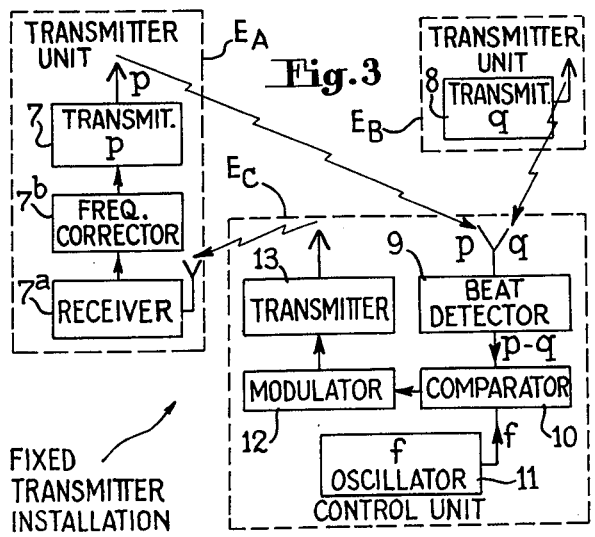
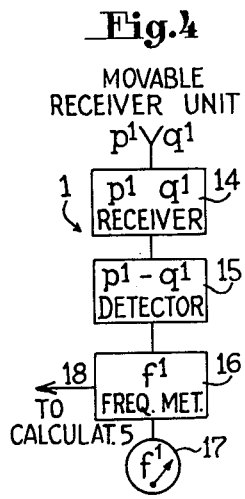
INVENTOR.
PIERRE GAUDILLERE
BY LeBlanc and Shur
ATTORNEYS

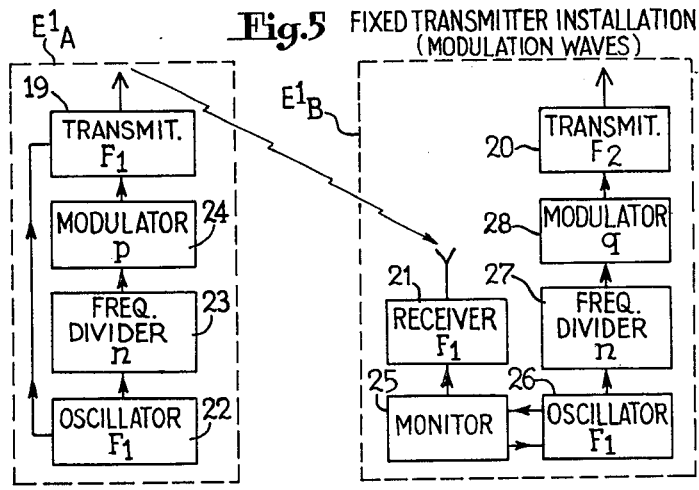
Fig. 5 FIXED TRANSMITTER INSTALLATION (MODULATION WAVES)
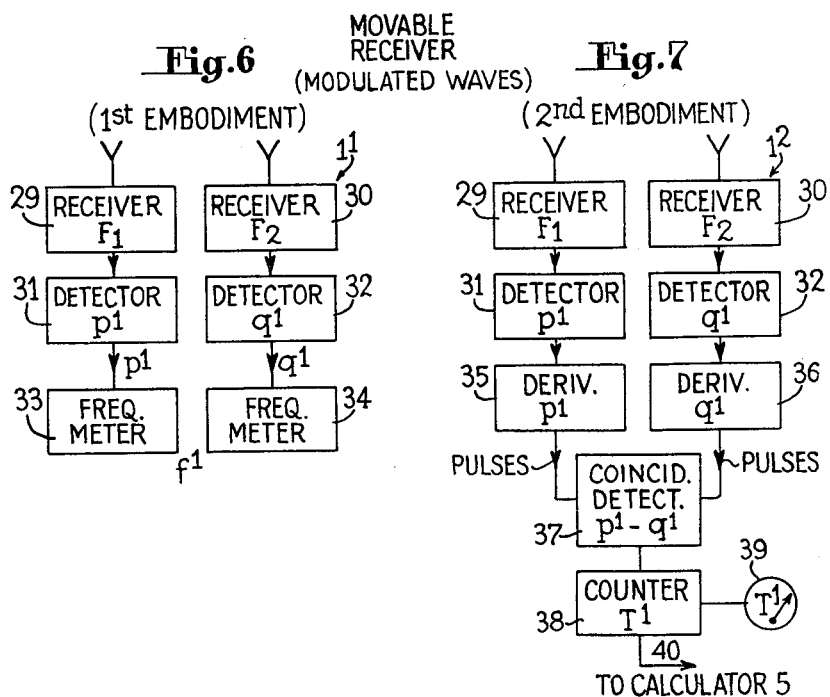
Fig. 6 MOVABLE RECEIVER (MODULATED WAVES) (1st EMBODIMENT)
Fig. 7 (2nd EMBODIMENT)
INVENTOR.
PIERRE GAUDILLERE
BY LeBlanc and Shur
ATTORNEYS

United States Patent Office 3,111,670
Patented Nov. 19, 1963

3,111,670
DEVICE FOR DETERMINING THE DIRECTION OF THE GROUND SPEED OF A MOVING BODY
Pierre Gaudillere, Neuilly-sur-Seine, France; Odette Gaudillere, 9 Rue Edouard Nortier, Neuilly-sur-Seine, France, and Collette Gaudillere Bernard, 8 Rue Nicolo, Paris, France, heirs of said Pierre Gaudillere, deceased
Filed Dec. 9, 1959, Ser. No. 858,511
Claims priority, application France Dec. 19, 1958
2 Claims. (Cl. 343—112)

The invention relates to a device, termed hereinafter "direction finder" which is adapted to define with accuracy the direction of the ground speed or the "course angle" of a moving body.

The conventional methods of dead reckoning have recently been very substantially improved owing to the use of systems enabling the ground speed to be measured, such as Doppler radars and inertia-operated apparatus.

The main cause for error in said methods is due to the uncertainty as to the reference direction (meridian or arc of any great circle) relative to which the direction of the speed vector is determined. This reference direction is given by magnetic compasses, the errors of which may reach several degrees, or by gyro-devices having often a substantial drift after being operated for several hours. The errors in the reference direction are particularly pronounced in polar regions, where magnetic or gyro compasses are of no avail.

The purpose of the direction finder according to the invention is to determine with accuracy the direction of the ground speed by using the transmissions from a pair of ground-located radio-transmitters. The use of this device assumes that the dead-reckoned position of the moving body is known with a sufficient approximation, but the datum supplied by the said device can be in turn used to determine this dead-reckoned position.

The use of this direction finder permits:

Either to check from time to time the apparatus supplying the reference direction, Or directly and permanently piloting the moving body on a predetermined course.

The direction finder according to the present invention comprises in combination: on the one hand, at two spaced apart locations on the ground, two radio transmitter sets sending out signals of neighbouring but distinct frequencies $p$ and $q$, and, on the other hand, aboard the moving body, an installation comprising at least means for receiving said signals and measuring the frequency $f^1$ (or the period $T^1$) of the beat of the signals of frequencies $p^1$ and $q^1$ received aboard the moving body.

In a first embodiment of this device which is intended for a movable body provided with means known per se for measuring the value $v$ of the speed of the moving body, the direction finder of the invention can be limited to the above-mentioned elements.

Thus, assuming that the angle of position or course angle R, i.e. the direction of the ground speed of the moving body, is known at least approximately, the values $v$ and R enable at any time a "dead reckoning" of the position of the moving body to be made, and as will be seen further on, the knowledge of said position enables a more accurate value of R to be reckoned by conventional means, this enabling in turn the precise position to be found.

According to another embodiment of the invention, the direction finder comprises in combination, besides the aforementioned elements providing the value of $f^1$, an apparatus adapted to constantly measure the value $v$ of the speed of the moving body, means for automatically calculating, as a function of $v$ and R, of the coordinates $x$ and $y$ the moving body, and means for automatically calculating, as a function of $f^1$, $v$, $x$, and $y$, a more accurate value of R.

The aforesaid device can further include means for effecting at any given point of the course a comparison between the data provided by the direction finder and the previously determined corresponding theoretical values for all the points of the course, and means responsive to the thus-detected error, said means indicating said error and/or utilizing it for the purpose of acting on the means piloting the moving body, in order to correct the direction of the ground speed of the moving body.

Both frequencies $p$ and $q$ can be those of pure continuous waves emitted by the two transmitters, respectively; they can also be amplitude-modulation frequencies or frequency-modulation frequencies, applied to carrier waves emited by both transmitters on clearly distinct frequencies.

Underlying the invention are the following theoretical considerations:

It is known (cf. U.S. Patent No. 2,727,231) that the two signals of frequencies $p$ and $q$, emitted by both transmitters A and B, are received in phase, at any given moment and on all points of a line called "isophase line," having substantially the shape of a branch of a hyperbola having foci A and B. This isophase line moves with a space-sweeping motion at a speed which, when measured on the axis A B, is equal to $$V_0 = c\frac{p-q}{p+q}$$

wherein $c$ is the propagation speed of the radio waves. At a point M of any location such that the angle $AMB = 2\theta$, the speed of propagation of the isophase line in a direction perpendicular to the isophase is equal to $$V = \frac{V_0}{\sin \theta}$$

The isophase lines pass through any given first point at a frequency $f = p - q$, called the sweep frequency. The time interval between two sequential passages T, called sweep period, can be expressed as:

$$\frac{1}{f} = \frac{1}{p-q}$$

If a mobile point M is moving at a speed $v$ along a path making an angle $\alpha$ with the isophase line, it approaches point A at a speed $v \cos(\alpha - \theta)$ and approaches point B at a speed $v \cos(\alpha + \theta)$.

The phenomenon known as the Doppler-Fizeau principle gives to the frequencies received aboard the moving body, apparent frequencies:

$$p^1 = p\left[1 - \frac{v}{c}\cos(\theta - \alpha)\right] \text{ and } q^1 = q\left[1 - \frac{v}{c}\cos(\theta + \alpha)\right]$$

The sweep frequency becomes:

$$f^1 = p^1 - q^1 = (p-q)\left(1 - \frac{v}{c}\cos\alpha \cos\theta\right)$$

$$- (p+q)\frac{v}{c}\sin\alpha \sin\theta -$$

hence:

$$f^1 = f\left(1 - \frac{v}{c}\cos\alpha \cos - \frac{v}{V}\sin\alpha\right)$$

The term $$\frac{v}{c}\cos\alpha \cos\theta$$

is less than 1/1,000,000 for moving bodies having a speed lower than 300 m./sec., or 1,080 km./hr. or 600 knots; it is therefore negligible relative to unity.

It can thus be put down practically:

$$f^1 = f\left(1 - \frac{v}{V} \sin \alpha\right)$$

hence:

$$\sin \alpha = \frac{V}{v} \frac{f - f^1}{f}$$

hence:

$$\alpha = \arc \sin \frac{V}{v} \frac{f - f^1}{f} \quad (1)$$

The apparent period of sweeping is:

$$T^1 = \frac{1}{f^1} = \frac{T}{1 - \frac{v}{V} \sin \alpha}$$

is equal to practically:

$$T^1 = T\left(1 + \frac{v}{V} \sin \alpha\right)$$

hence:

$$\sin \alpha = \frac{V}{v} \frac{T^1 - T}{T} \text{ and } \alpha = \arc \sin \frac{V}{v} \frac{T^1 - T}{T} \quad (2)$$

The Equations 1 and 2 show that the value of $\alpha$ can be calculated when $f^1$, $v$ and $V$ are known. If the position of the moving body is assumed to be known at least approximately, then the value of the speed $V$ of propagation of the isophase line is known at this point as well as the direction thereof, the latter being given, e.g. by the angle $\gamma$ formed by the isophase with the meridian at this point. These values $V$ and $\gamma$ can be calculated, or, easier still, read off a map provided with a network of, on the one hand, curves $\theta$=constant, wherein the value $V$ is constant and, on the other hand, curves representing to the successive shapes taken by the isophases in the course of their displacement between A and B. The latter curves permit measuring at any point thereon the value of the angle $\gamma$ formed by the isophase line with the meridian intersecting the particular point; or even better, the map can be provided with the network of curves for which $\gamma$ has a constant value.

The value of $\gamma$ is thus obtained and hence the value $R = \alpha + \gamma$.

In the appended drawings:

FIGURE 1 is an exemplary showing of a map bearing a network of curves on any point of which $$\frac{V}{V_0} = \text{constant}$$

(for example 1, 1.25 . . . 2) and a network of isophases;

FIGURE 2 is a diagrammatic showing of the principle of the direction finder and of the use thereof, also adapted to show the direction finder in its most complex form;

FIGURE 3 is a diagrammatic showing of the fixed transmitter installation when pure continuous waves are used;

FIGURE 4 is a diagrammatic showing of the movable installation receiving the signals transmitted by the fixed set of FIG. 3 and giving the value of frequency $f^1$;

FIGURE 5 is a diagrammatic showing of the fixed transmitter installation in the case where modulated continuous waves are used;

FIGURE 6 is a diagrammatic showing of the movable installation receiving the signals transmitted by the set of FIG. 5 and giving the value of the periods $p^1$ and $q^1$; and FIGURE 7 is an alternative embodiment of the movable installation in accordance with FIG. 6, which embodiment enables the value of $T^1$ to be directly obtained.

FIGURE 8 is the explanatory diagram referred to hereinabove.

According to the embodiment shown in FIG. 2, the direction finder comprises a fixed installation on the ground S and a movable installation M carried by a moving body.

The fixed installation S comprises at two points A and B, which may be normally several hundred kilometers from each other, two radio transmission sets $E_A$, $E_B$ sending out signals on frequencies $p$ and $q$, which are close to each other but different, the value of this difference being dependent on the nature of the signals being transmitted, it will be defined further on.

The synchronizing of these two sets is obtained by means of a synchronizing device $E_C$. Two embodiments of this fixed station will be described hereinafter.

The movable installation M includes a radio set 1 which receives either directly or after detection, depending on the kind of transmitted signals, signals of frequencies $p$ and $q$ which, by virtue of the Doppler-Fizeau principle, have upon reception frequencies $p^1$ and $q^1$, and combines said signals so as to supply at the output from this receiving set, the value of the frequency $f^1$ or the beat period $T^1$ of said frequencies $p^1$ and $q^1$.

The installation further includes a device 2 adapted to measure the speed of the moving body proper; this device can be of any known type, such as a log, kinemometer, Doppler Radar or inertia-operated means.

The other blocks shown in FIG. 2 of the unit M represent graphically the various stages of the operations of reckoning or data-reading which are effected by conventional means or alternatively by calculating machines capable of automatically effecting said readings.

At 3, the dead reckoning is effected by means of information transmitted to 3, on the one hand, by the unit 2 which supplies the value of $v$ and, on the other hand, by a further reckoner unit 6 (referred to hereafter) which supplies the value of $R = \alpha + \gamma$ The position of the moving body being known, the speed $V$ of the isophase at this point and the angle $\gamma$ comprised at this point between the isophase and the meridian are also known. These values can indeed be reckoned at 4 or, even simpler, given by a map (FIG. 1) of the area including the course, said map being provided with two networks of curves which correspond, the first, to the sequential shapes taken by the isophases I (generated by the pair of transmitters A and B) during their displacement through said area and, the second, to given values (1–1, 25–1, 50–1, 75–2) of the quantity $$\frac{V}{V_0} = \frac{1}{\sin \theta}$$

i.e. to quantities given given by the angle (cf. FIG. 8). Each of the curves of this second net work corresponds to a value of $V$.

The values of $V$ and $\gamma$ can also be supplied by one or two double-entry tables giving for any combination of coordinates $x$ and $y$ of the moving body the value of $V$ and/or $\gamma$, either by an abacus or by means of a calculating device since to each pair of coordinates $x$ and $y$—i.e. to each point of the map—corresponds one value of $V$ and one value of $\gamma$.

At 5 is calculated either by conventional means or by a calculating device, the value $\alpha$ given by Formula 1 or by Formula 2, the values $f^1$ and $T^1$ being supplied by (1), the value of $v$ being given by the device 2, and the value of $V$ being given by 4.

At 6 is effected by conventional means or by means of calculating device the addition $\alpha + \gamma = R$; in this calculator 6, the value of $\alpha$ is received from the calculator 5 and the value of $\gamma$, from the calculator 4.

The two calculators 5 and 6 can obviously be replaced by a single calculator 5—6, which is capable of calculating R from $V$, $v$, $f^1$ and $\gamma$. The thus obtained value of R is used for the dead-reckoning at 3.

It will be noted that a first determination of the "bearings" or "point," obtained e.g. by dead reckoning, based upon a measure of $v$ and upon an approximate calculation of R by means of the heading supplied by the gyroscopic or magnetic compass of the moving body and the drift, is sufficient to obtain at 6 a fairly accurate value of R, said value being fed to 3 to be compared with said approximate value of R, or to be used for the purpose of a second determination of a "dead-reckoning" having a higher precision than the former.

This is due to the fact that in general, and except in the immediate vicinity of the transmitters $E_A$, $E_B$, the values of V and $\gamma$ are changing slowly and that it is sufficient to know an approximate position of the moving body to be able to determine these values with a sufficient precision and thus obtaining a fairly accurate value of $\alpha$ and then of R.

It will thus be appreciated that it is enough for the moving body to be equipped with a device 2 for measuring $v$ and a receiver apparatus for measuring $f^1$ (or $T^1$), to enable R and the dead-reckoned position to be constantly known, from a point of known position and in particular from the starting point.

However, the operations referred to under reference numerals 3, 4, 5 and 6 can also be effected by indicators or calculating devices combined with the measuring devices 1 and 2, and this combination is within the scope of the invention.

According to a first embodiment of the invention, in which pure continuous waves are used, the transmitter installation S is of the type shown in FIG. 3 and the part receiving and determining $f^1$ in the movable installation is of the type shown in FIG. 4.

The transmitters 7 of $E_A$ and 8 of $E_B$ produce pure continuous waves of different frequencies $p$ and $q$, said difference being some hundreds of cycles or some kilocycles. A monitoring or control unit $E_C$, located at a sufficient distance from the units $E_A$ and $E_B$, comprises a receiver 9 receiving simultaneously both their transmissions and detecting the beat, the frequency $p-q$ of which must be equal to a known quantity $f$. This beat is compared at 10 with a stable oscillator 11 having a frequency $f$. If both frequencies are not equal, the comparator 10 sends an error voltage to a modulator 12 which modulates the transmission of a special transmitter 13 which belongs to the unit $E_C$: said transmitter sends out if necessary a signal meaning "beat frequency too high" or a signal meaning "beat frequency too low." Adjacent one of the transmitters, for example $E_A$, is provided a receiver 7a receiving the signals sent out from $E_C$ and controlling a frequency correcting circuit 7b to increase or decrease, as the case may be, the frequency $p$ of the transmitter 7 of $E_A$.

The set 1 of the mobile unit comprises (FIG. 4) a receiver 14 adapted to receive simultaneously the transmissions from $E_A$ and $E_B$, a detector 15 detecting the beat thereof, and a frequency-meter 16 of any known type, which supplies the value of $f^1$ which may be read at 17 and which may be transmitted at 18 to the calculator 5 supplying the value $\alpha$.

According to a second embodiment of the invention, wherein modulated continuous waves are used, the transmitter unit is of the type shown in FIG. 5, and the part receiving and determinating $T^1$ of the movable installation can be of the type illustrated in FIG. 6.

Both transmitters 19 and 20 of the units $E^1_A$ and $E^1_B$ have carrier frequencies $F_1$ and $F_2$ which are distinctly separated. These waves are modulated by sine-oscillations having frequencies $p$ and $q$, respectively, the modulation being effected either in amplitude or in frequency.

At one of the units, for instance the unit $E^1_B$, is arranged a receiver 21 which intercepts the signals from $E^1_A$ and controls the local modulation frequency $q$, so that the difference $p-q$ remains equal to a fixed value $f$. Since in this case the said value is very low (generally less than 1 cycle), it is difficult to control directly the beat frequency. It is then preferable to select $p$ and $q$ amongst the integer sub-multiples of $F_1$, since $$p = \frac{F_1}{n} \text{ and } q \frac{F_1}{n^1}$$

wherein $n$ and $n^1$ are integers.

At the unit $E^1_A$, an oscillator 22 having a frequency $F_1$ pilots the carrier wave. By means of a device 23 dividing by $n$, it also pilots a modulator 24. At the unit $E^1_B$, the receiver 21 receives the signals of frequency $F_1$, brings under control thereof (at 25) a local oscillator 26, and the latter acts on a device 27, dividing by $n^1$, so as to obtain in 28 the modulation frequency $q$.

The receiving unit of the movable installation comprises a two-channel receiver $1^1$ (FIG. 6), which receives separately at 29 and 30 the signals from $E_A$ and $E_B$, detects at 31 and 32 the modulations whose frequencies are $p^1$ and $q^1$, and applies them to a pair of frequency meters 33, 34 which measure said quantities, whence the difference $f^1 = p^1 - q^1$ can be deduced.

The receiver set of the movable installation can also be embodied (FIG. 7) in the form shown as $1^2$, wherein at 35 and 36, the oscillations of frequencies $p^1$ and $q^1$ are converted to thin pulses by means of conventional amplifying, peak clipping and deriving methods. The coincidences between the pulses of the two series are then detected at 37, and the time separating two sequential coincidences is measured (by means of an electronic counter 38 having known frequency pulses fed thereinto); said separating time is equal to $T^1$ read at 39, which value may also be transferred at 40 to the calculator 5.

Calculation shows that the determination of the course angle by means of the device of the invention can be effected with generally greater accuracy than is possible with course direction indications furnished by a compass, providing the following precautions are taken:

Insure good stability of the frequencies $p$ and $q$ by means of the aforesaid synchronising devices or by controlling these frequencies by way of very high-precision oscillators.

Avoid using the device for courses in the vicinity of perpendiculars to the isophase lines, since an error in the measure of $\sin \alpha$ can lead to a sizable error of the angle $\alpha$ when the latter is near 90°. Further, there can be ambiguity in respect of the same value of $$1 - \frac{\epsilon^2}{2} \text{ of } \sin \alpha$$

between the angles 90° $+\epsilon$ and 90° $-\epsilon$, $\epsilon$ being a small angle value.

If the aforesaid precautions are taken, the device can be used, not only when the signals are directly received from waves from the ground, but also when they are received from waves from the sky reflected on ionized strata of the upper atmosphere. In the latter case, the speed $c$ of the radio waves has to be replaced by the horizontal projection of the signal velocity; it is possible by means of lengthy observations, to establish statistics enabling the mean value of this velocity to be determined and, hence, the speed V of the isophase line, with an approximation of some hundredths (cf. statistic of the International Time Bureau). The residual error is but a small fraction of a degree, above all if the angle $\alpha$ is small.

For a specified course, the transmitters are advantageously arranged on a perpendicular drawn in the middle of said course, e.g. in Iceland and at the Azores for the crossing of North Atlantic (FIG. 1).

The device of the invention can be used by the crew intermittently, to check the indications given by the compasses, in particular to reset for example every hour a central gyro-heading unit. Upon measuring the velocity $v$ and the drift, the crew can measure $\gamma$ from the value of $f^1$ (or $T^1$) given by the device and compare the value $\alpha + \gamma$ with the course angle defined by the sum of heading and the drift. The possible error enables the heading to be corrected.

The device can be further used in a continuous manner to pilot the moving body directly along a predetermined route. Since the velocity $v$ is permanently measured, this measure is integrated to obtain the distance already gone through from the start:

$$D = \int_0^t v\, dt$$

The values of V and sin $\alpha$, previously measured for the whole route, are registered on a tape which is unwound under the control of the distance indicator D. These indications, as well as that of the velocity $v$ are transmitted to a digital or analog computer, which supplies the value of $$f\left(1 - \frac{v}{V}\sin \alpha\right) \text{ or of } T\left(1 + \frac{v}{V}\sin \alpha\right)$$

This value is compared with that of $f^1$ or of $T^1$, supplied by the device. Any difference is shown by an error voltage directly readable by the pilot on a graduated dial. The piloting is effected by maintaining the needle on the zero mark.

This piloting may be made entirely automatic by directly applying the error voltage to a servo-mechanism acting on the steering members of the aircraft. The changing of the registered tape enables the route to be changed.

The device of the invention provides an accurate directional reference. The use thereof enables by means of simple ground apparatus and very light equipment, on board the moving body deriving full benefit from autonomous navigation systems (Doppler or inertia) which measure with accuracy the magnitude of the ground speed.

The invention is not limited to the embodiments described and shown, which are given merely by way of example, and various alterations of detail can be made therein without departing from the scope of the appended claims.

Having now described my invention what I claim as new and desire to secure by Letters Patent is:

1. A device for determining the direction of the ground speed or "course angle" R of a moving body, said device comprising at two spaced apart locations on the ground, two radio-electric transmitter units sending out signals of neighbouring but distinct frequencies $p$ and $q$, and, aboard the moving body, an installation comprising means to receive the said signals and to measure the beat-frequency $f^1$ of signals of $p^1$ and $q^1$ frequencies received aboard said moving body, an apparatus enabling the value $v$ of the velocity of the moving body to be constantly measured, means to automatically calculate, as a function of $v$ and of an approximate value of the course-angle R of the moving body, the coordinates $x$ and $y$ of said moving body, and means to automatically calculate, as a function of $f^1$, $v$, $x$ and $y$, a more accurate value of the course-angle R.

2. A device according to claim 1, wherein frequencies $p$ and $q$ are modulation frequencies applied to carrier waves sent out by both transmitters, the frequencies of said carrier waves being clearly distinct from each other.

References Cited in the file of this patent
UNITED STATES PATENTS

| 2,218,907 | Donnelly et al. | Oct. 22, 1940 |
| 2,727,231 | Gaudillere | Dec. 13, 1955 |
| 2,850,729 | Gaudillere | Sept. 2, 1958 |

OTHER REFERENCES

"The Practical Combination of Air Navigation Techniques," by H. J. Galbraith and N. Braverman, IRE Transactions on Aeronautical and Navigational Electronics, March 1956, pp. 3–10 relied on, 235–61 NAV.